United States Patent [19] [11] 4,184,853
Otopkov et al. [45] Jan. 22, 1980

[54] INDIVIDUAL ABRASIVE GRAINS WITH A SILICON-BASE ALLOY COATING

[76] Inventors: Petr P. Otopkov, 9 Sokolnicheskaya ulitsa 20, kv. 51; Alla V. Nozhkina, ulitsa Kozlova, 38, kv. 1; Valery I. Kostikov, ulitsa Vavilova, 93, kv. 91; Jury I. Andropov, prospekt Mira, 49, kv. 66; Anatoly I. Senchakov, prospekt Mira, 70, kv. 32; Anna Y. Pesina, ulitsa Taganrogskaya, 11, korpus 2, kv. 16; Alexandr V. Kabanov, ulitsa Svobody, 93, korpus 1, kv. 284, all of Moscow, U.S.S.R.

[21] Appl. No.: 678,992

[22] Filed: Apr. 21, 1976

[51] Int. Cl.² .............................................. B24D 3/06
[52] U.S. Cl. ...................................... 51/295; 51/309; 427/214; 427/217
[58] Field of Search .................. 51/309, 295; 427/214, 427/217

[56] References Cited

U.S. PATENT DOCUMENTS

| | | | |
|---|---|---|---|
| 3,239,321 | 3/1966 | Blainey et al. | 51/309 |
| 3,293,012 | 12/1966 | Smiley et al. | 51/295 |
| 3,372,010 | 3/1968 | Parsons et al. | 51/309 |
| 3,868,234 | 2/1975 | Fontanella | 51/309 |
| 3,879,901 | 4/1975 | Caveney | 51/295 |
| 4,024,675 | 5/1977 | Naidich et al. | 51/309 |

Primary Examiner—Donald J. Arnold
Attorney, Agent, or Firm—Lackenbach, Lilling & Siegel

[57] ABSTRACT

An abrasive material the grains of which have at least a three-component coating comprising silicon, at least one element of the group which consists of copper, silver, gold, aluminium and transition metals of the 4th–8th groups of the periodic system, and an element chosen from the group which consists of gallium, indium, thallium, germanium, tin, lead, phosphorus, antimony, tellurium and sulphur.

14 Claims, No Drawings

INDIVIDUAL ABRASIVE GRAINS WITH A SILICON-BASE ALLOY COATING

The present invention relates to abrasive materials and more specifically to abrasive materials with coated grains.

The invention can be advantageously used for processing diamonds and other hard-to-treat materials by the grains of an abrasive material in a free state, as well as for manufacturing abrasive tools based on organic, ceramic and metal adhesives.

At present, for grinding, dressing, cutting and boring purposes tools are used made of various abrasive materials the grains of which have a coating on their surface.

It is well known that the binder in an adhesive does not always ensure strong binding of abrasive particles in the matrix, therefore, various coatings are applied to the surface of abrasive particles.

Such coatings must meet a number of requirements.

First, the coating must be strongly bound with the surface of an abrasive.

Such binding is ensured only by the chemical interaction between the components of said coating and abrasive. The energy of such interaction may amount to tens or even hundreds of grand calories, whereas the energy of the physical interaction (the Van der Waals forces) amounts to fractions or units of grand calories.

Second, the coating must enhance the strength of an abrasive grain, especially when the grain is in a free state.

It is also known that the strength of an abrasive material can be increased through greater plasticity of the coating, as can be inferred from the Griffiths-Irwin-Orovan theory:

$$Fe_2 = \sqrt{2E(\sigma_{s-b} + \sigma_{pl})}/\pi e$$

(FB$_2$-ultimate breaking load)
where $\sigma_{s-b}$—the surface energy of a solid body on the boundary with a medium, erg/cm$^2$;
$\sigma_{pl}$—the energy of plastic flow, erg/cm$^2$;
l—half-length of a crack nucleus;
E—modulus of elasticity.

Third, the material of said coating must be conducive to an increase in the efficiency of the surface of the material being treated.

As it follows from the Griffiths theory, the breaking load for the material being treated depends on the value of its free surface energy $\sigma_{s-b}$. This value can decrease under the action of chemical reactions occurring at the interface between the material being treated and the abrasive material, which leads to an increase in the efficiency of processing the surface of the material to be treated.

Fourth, the material of the coating must interact chemically with the components of the binder (a mass meant for binding abrasive particles in the process of manufacturing a tool which mass, together with said particles, forms the body of said tool-matrix). The interaction must occur at temperatures, under pressures, and in media, which are envisaged by the tool-making technological processes. At the same time, the physical-mechanical properties of the matrix must not deteriorate.

The coating must be corrosion- and heat-resistant, and must preserve its initial properties in long-term storage. The process of producing such coatings must be easily effected, without using complicated equipment and costly materials.

Metals and non-metals, their carbides, borides or oxides, or their mixtures can be used as grain coatings.

It is known that coatings applied to diamond grains consist of one or several metals chosen from the group: Ni, Co, Ag, Cu, Mo, Ti, Al, Mu, Cd, Sn, Pb, Zn, Cr, Au, W, Tn, Fe, Zr, Pt, Ro, Pd, or alloys and mixtures thereof which contain at least one of said metals.

Said coatings, however, are inadequate, as they are insecurely bound with the surface of diamond grains because metals are applied to diamond at low temperatures (160°–200° C.). In this case, no chemical bond is formed. The metallic film is kept on the surface of said diamond grain mechanically due to the microroughness of the diamond or by the weak forces of the physical interaction.

Diamond grains with said coatings are used in discs where only resins (organic adhesives) act as binders. In spite of a certain improvement in the interaction between the coating material and the binder (as compared to a pure uncoated diamond), the effect of increasing the durability of holding the diamond grains in the matrix is not great because of a poor cohesion between the diamond and said coating.

Known in the art is a method for metallization of abrasive grains, which consists in applying a coating of silicon or such metals as: Fe, Ni, Be, B, Co, Nb, Cr, Mo, or alloys such as: Fe-Nb, Fe-Cr, Fe-V, Fe-Si, by way of evaporation coating, cathode sputtering or decomposition of carbonyls of corresponding metals.

However, evaporation coating of metals is applicable on an industrial scale for a limited number of metals, chiefly fusible metals.

Cathode sputtering is difficult to control and regulate and demands the use of complicated equipment; therefore, it is not economical in large-scale production.

The use of metal carbonyls for the purpose necessitates strict accident-prevention measures, which considerably adds up to the cost of the metallization process.

Known in the art are abrasive materials whose grains have at least a two-component coating comprising silicon. The other component of this coating is carbon.

When applying such coating to diamond grains, the latter are placed in a gas medium which contains volatile compounds of silicon, for example, cyanogen chloride, and of carbon, for example, methane.

Silicon carbide is formed as a result of the reaction between said compounds and deposits itself on the diamond surface. In this case, the formation of strong chemical bonds between the coating and diamond is impeded, as in the deposited compound the silicon is already chemically bonded with the carbon, therefore all the bonds are saturated, and the possibility of silicons reacting with the diamond carbon is small.

Also known in the art is an abrasive material the grains whereof have at least a two-component coating which includes silicon and at least one more metal chosen from the group consisting of copper, silver, gold, aluminum and transition metals of the 4th–8th groups of the periodic system.

Silicon is known to actively interact with diamond, the wetting angle is close to zero, and addition of small quantities (up to 5 weight percent) of silicon to metals (Cu, Ag, Ni, Al, Sn, etc.) which insufficiently wet the diamond, sharply improves the wetting of the diamond surface (the wetting angle diminishes from 120° to 5°).

Therefore, silicon is a suitable element ensuring the strength of cohesion between a coating and diamond.

The selection of a second component from said group of metals is mainly determined by the components of the adhesive of a tool.

All the above-mentioned metals chemically interact with silicon. The diagram of the "silicon - metal" state is well known. Due to this fact, it is always possible to choose such components of coating which actively interact with the binder of a tool and which possess the required physical-mechanical properties.

In this case, the chemical interaction of a coating with an abrasive is ensured by the presence of silicon in the coating, while the chemical interaction with a binder is ensured by the presence in the coating of a second component which has chemical affinity with the adhesive material.

This abrasive material can be produced by different methods.

Experience has shown that the most economical method for producing such an abrasive material is joint caking of the powders of an abrasive and the components of a coating in vacuum, resulting in the formation of an alloy liquid phase, which phase adequately wets the surface of the abrasive, or of a coating layer formed by solid-phase caking at a temperature of more than 1,200° C., or a coating layer formed by caking at a temperature of less than 1,200° C., but with a silicon content over 50 weight percent.

Investigations have shown, however, that the heating of diamond powders above 1,200° C. in a vacuum of at least $5 \cdot 10^{-5}$ torr reduces the strength of both synthetic and natural diamond powders, and the presence in the coating material or more than 50 weight percent of silicon leads to an increase in the brittleness of the abrasive material.

The above factors limit the possibility of producing an abrasive material by the method of joint caking of powders of an abrasive material and components of a coating.

The principal object of the present invention is to provide an abrasive material the grains whereof have a coating of such a silicon-base alloy that will ensure high plasticity of the coating and strengthen the abrasive material.

Another no less important object of the invention is to provide an abrasive material the grains whereof have a coating of such a silicon-base alloy that will ensure its lower melting temperature, as compared to the prior art abrasive materials.

Still another object of the present invention is to provide an abrasive material, similar to the above-mentioned material, but with such coating of its grains that will help to increase the efficiency of processing the surface of the material to be treated, as compared to the prior art abrasive materials.

These and other objects are achieved by providing an abrasive material the grains whereof have a coating of a silicon-base alloy which comprises, taken separately or in a combination, copper, silver, gold, aluminum, and transition metals of the 4th–8th groups of the periodic system, wherein, according to the invention, the alloy also comprises gallium, indium, thallium, germanium, tin, lead phosphorus, antimony, tellurium and sulphur, taken separately or in a combination, in a quantity of from 2 to 80 weight percent of the total weight of said coating.

We have found that introduction into the coating of an element chosen from the group consisting of gallium, indium, thallium, germanium, tin, lead, phosphorus, antimony, tellurium and sulphur (fusible elements), and taken separately or in a combination in a quantity of from 2 to 80 weight percent of the total weight of the coating, makes it possible to strengthen the abrasive material, as this leads to a greater coating plasticity and, consequently, to a higher abrasive strength, and also results in a lower melting temperature of the coating material, which, in turn, increases the durability of said coating on the abrasive.

In addition, the interaction of said fusible elements with the surface of the material being treated leads to a reduction in the value of the free surface energy of said material, which increases the efficiency of processing the material.

The abrasive material, according to the invention, is most effective in processing hard-to-treat materials, for example, diamond, owing to the fact that elements incorporated in the composition of its coating have the ability to accelerate chemical reactions on the surface of the material being treated and to reduce its free surface energy, while the abrasive material itself possesses a higher strength, as compared to the known similar abrasive materials.

By properly selecting alloy components one can substantially improve the characteristics of the material.

The appropriate thickness of a coating varies from 0.01 to 1.000 microns.

It is known that the thinner a coating, the lower the stresses occurring in the area of contact between the coating and abrasive material.

Besides, the ability of components to react in thin coating (films), e.g., the diffusion coefficient, is substantially higher than that in a compact material. Therefore, in the case when the temperatures specified in the tool-manufacturing technology are not great (<700° C.) and cannot ensure a sufficient chemical interaction between the components of a coating and a binder, for example, in manufacturing tools on an organic binder, the use of thin coatings of the order of 1 mu is effective.

In case of using abrasive-coated grains for tools the manufacturing technology of which stipulates the use of liquid metals (during soaking and baking in the presence of a liquid phase or during soldering), the thickness of coatings must be substantially higher than 1 mu.

For manufacturing monocrystal abrasive tools the thickness of a coating must be of the order of 1,000 mu.

For manufacturing a wide range of tools on various binders made from the proposed abrasive material, it is advisable to use the following experimentally selected compositions of the grain coating.

For manufacturing diamond pastes it is recommended to use an abrasive material with a coating which comprises (in weight percent):

silicon: 20–40
iron: 40–60
tin: 10–30, and which has an optimum thickness of 1 to 20 mu.

Said abrasive material is most effective in treating hard alloys.

It has been found experimentally that for making pastes meant for processing steels it is expedient to use an abrasive material with a coating which comprises (in weight percent):

silicon: 10–50
titanium: 45–85 indium: 2–4
and which has an optimum thickness of 0.01 to 1.00 mu, since these pastes are intended for finishing operations.

For manufacturing diamond cloths meant for processing steels it is advisable to use an abrasive material with a coating which comprises (in weight percent):
silicon: 50–92
vanadium: 5–30
tin: 2–6
and which has an optimum thickness of 1 to 40 mu.

In discs based on an organic binder, it is expedient to use an abrasive material in the form of coated grains, the coating comprising (in weight percent):
silicon: 10–50
molybdenum: 45–85
sulphur: 2–10
and which has an optimum thickness of 5 to 150 mu.

For manufacturing discs based on an organic binder, meant for processing hard alloys, it is recommended to use an abrasive material with a coating which comprises (in weight percent):
silicon: 10–45
manganese: 50–85
gallium: 2–8
and which is of 100 to 400 mu thick.

For diamond honing tools an abrasive material is recommended with a coating which comprises (in weight percent):
silicon: 10–50
cobalt: 30–80
phosphorus: 5–10
and which is from 50 to 80 mu thick.

For processing hard-to-treat materials, for example diamond, it is appropriate to use an abrasive material with a coating which comprises (in weight percent):
silicon: 15–70
nickel: 10–80
tin: 2–40
and which has an optimum thickness of 0.1 to 10 mu.

For manufacturing tools on a metallic binder it is expedient to use an abrasive material with a coating which comprises (in weight percent):
silicon: 0.3–3.0
copper: 10–60
tin: 30–80
and which is from 50 to 1,000 mu thick.

For manufacturing tools on a ceramic binder it is expedient to use an abrasive material with a coating which comprises (in weight percent):
silicon: 20–60
aluminum: 10–70
phosphorus: 0.5–3.0
and which is from 150 to 400 mu thick.

It is expedient that an alloy also contain yttrium, lanthanum, or cerium, taken in a quantity of 0.01 to 25.00 weight percent.

Said elements present in the composition of the coating raise the heat resistance of the proposed abrasive material and also protect the grain of said abrasive from oxidation in the process of operation in a free state, or in a tool in the case when high local temperatures appear at the points of contact between the abrasive material and the material being treated.

Thus, the proposed abrasive material can be effectively used in processing diamonds and other hard-to-treat materials by the grains of an abrasive material in a free state, as well as for manufacturing abrasive tools on organic, ceramic and metal lic binders; in such a case, the coating for abrasive grains is a silicon-base alloy which includes at least one element exhibiting chemical affinity with the components of the adhesive.

The abrasive material according to the invention comprises a coating of such a silicon-base alloy that ensures its high plasticity, lower melting temperature and also high heat resistance; the coating protects the grains from oxidation and helps to increase the efficiency of processing the surface of the material under treatment, as compared to the prior art abrasive materials.

The invention will now be explained in greater detail with reference to specific examples of its embodiments.

Coating of the grains of an abrasive material can be effected by any conventional method suitable for the purpose, however, it is preferable to use the method of joint caking of abrasive grains and coating components in vacuum.

EXAMPLE 1

A coating made of an alloy comprising 30 weight percent of silicon, 50 weight percent of iron and 20 weight percent of tin and having a thickness of 10 mu is applied in vacuum to the grains of synthetic diamonds by way of joint caking of the diamond grains and the powdered components of the coating.

The abrasive material thus obtained is used for making a diamond paste.

The performance of this paste in treating ceramics is 1.5 times higher than that of a paste made from the prior art abrasive materials.

EXAMPLE 2

A coating comprising 12 weight percent of silicon, 85 weight percent of titanium, 3 weight percent of indium and having a thickness of 0.01 mu is applied in vacuum to the grains of natural diamonds by way of joint caking of the diamond grains and the powdered components of the coating.

The abrasive material thus obtained is used for making a diamond paste.

The performance of this paste in treating hard alloys is 20 percent higher than that of a paste made from the prior art abrasive materials.

EXAMPLE 3

A coating comprising 92 weight percent of silicon, 6 weight percent of vanadium, 2 weight percent of tin and having a thickness of 1 mu is applied in vacuum to the grains of boron nitride by way of joint caking of the from nitride grains and the powdered components of the coating.

The abrasive material thus obtained is used for making diamond cloths for treating steels.

The performance of said cloths is 30 percent higher than that of cloths made from the prior art abrasive materials.

EXAMPLE 4

A coating comprising 25 weight percent of silicon, 73 weight percent of molybdenum, 2 weight percent of sulphur and having a thickness of 5 mu is applied in a protective atmosphere under a pressure of 1.5 atm. to the grains of synthetic diamonds by way of caking of the diamond grains and the powdered components of the coating.

The abrasive material thus obtained is used for making discs based on organic binders.

The performance of these discs is 50 percent higher than that of discs made from the prior art abrasive materials.

EXAMPLE 5

A coating comprising 12 weight percent of silicon 82 weight percent of manganese, 6 weight percent of gallium and having a thickness of 100 mu is applied in vacuum to the grains of synthetic diamonds by way of joint caking of the diamond grains and the powdered components of the coating.

The abrasive material thus obtained is used for making discs based on an organic binder.

The performance of these discs in treating hard alloys is 30 percent higher than that of discs made from the prior art abrasive materials.

EXAMPLE 6

A coating comprising 30 weight percent of silicon, 63 weight percent of cobalt, 7 weight percent of phosphorus and having a thickness of 500 mu is applied in a protective atmosphere under a pressure of 1.5 atm. to the grains of synthetic diamonds by way of caking of the diamond grains and the powdered components of the coating.

The abrasive material thus obtained is used for making honing tools.

The performance of these honing tools is 50 percent higher, than that of tools made from the prior art abrasive materials.

EXAMPLE 7

A coating comprising 50 weight percent of silicon, 30 weight percent of nickel, 20 weight percent of tin and having a thickness of 7 mu is applied in vacuum to the grains of synthetic diamonds by way of a joint caking of the diamond grains and the powdered components of the coating.

The abrasive material thus obtained is used for processing hard-to-treat materials, for example, diamond with the aid of grains in a free state.

The performance of this abrasive material is 1.5 times higher than that of the prior art abrasive materials.

EXAMPLE 8

A coating comprising 1 weight percent of silicon, 19 weight percent of copper, 80 weight percent of tin and having a thickness of 1,000 mu is applied in vacuum to the grains of synthetic diamonds by way of joint caking of the diamond grains and the powdered components of the coating.

The abrasive material, thus obtained is used for making abrasive tools on a metallic binder.

The performance of these tools is 40 percent higher than that of tools made from the prior art abrasive materials.

EXAMPLE 9

A coating comprising 48 weight percent of silicon, 50 weight percent of aluminum, 2 weight percent of phosphorus and having a thickness of 200 mu is applied in a protective atmosphere under a pressure of 1.5 atm. to the grains of synthetic diamonds by way of caking of the diamond grains and the powdered components of the coating.

The abrasive material thus obtained is used for making abrasive tools on a ceramic binder.

The performance of these tools is 50 percent higher than that of tools made from the prior art abrasive materials.

EXAMPLE 10

A coating comprising 3 weight percent of silicon, 90 weight percent of chrome, 5 weight percent of tin, 2 weight percent of yttrium and having a thickness of 10 mu is applied in vacuum to the grains of synthetic diamonds by way of joint caking of the diamond grains and the powdered components of the coating.

The abrasive material thus obtained is used for making discs based on a metallic binder.

The performance of discs in processing glass is two times higher than that of discs made from the prior art abrasive materials.

What is claimed is:

1. In an abrasive substance of single grain selected from the group consisting of diamond and boron nitride having a coating of a silicon alloy which includes at least one element selected from the group consisting of copper, silver, gold, aluminum and transition metals of the 4th–8th Groups of the Periodic System, the improvement which comprises including in said coatings at least one additional element selected from the Group consisting of gallium, indium, thallium, germanium, tin, lead, phosphorus, antimony, tellurium and sulfur, said additional elements ranging in quantity from 2 to 80 weight percent of the total coating weight, the thickness of said coating being 0.01 to 1.000 micron.

2. An abrasive material as of claim 1, wherein said coating comprises (in weight percent):
   silicon: 20–40
   iron: 40–60
   tin: 10–30
   and is from 1 to 20 mu thick.

3. An abrasive material as of claim 1, wherein said coating comprises (in weight percent):
   silicon: 10–50
   titanium: 45–85
   indium: 2–4
   and is from 0.01 to 1.0 mu thick.

4. An abrasive material as of claim 1, wherein said coating comprises (in weight percent):
   silicon: 50–92
   vanadium: 5–30
   tin: 2–6
   and is from 1 to 40 mu thick.

5. An abrasive material as of claim 1, wherein said coating comprises (in weight percent):
   silicon: 10–50
   molybdenum: 45–85
   sulphur: 2–10
   and is from 5 to 150 mu thick.

6. An abrasive material as of claim 1, wherein said coating comprises (in weight percent):
   silicon: 10–45
   manganese: 50–85
   gallium: 2–8
   and is from 100 to 400 mu thick.

7. An abrasive material as of claim 1, wherein said coating comprises (in weight percent):
   silicon: 10–50
   cobalt: 30–80
   phosphorus: 5–10
   and is from 50 to 80 mu thick.

8. An abrasive material as of claim 1, wherein said coating comprises (in weight percent):

silicon: 15–70
nickel: 10–80
tin: 2–40
and is from 0.1 to 10 mu thick.

9. An abrasive material as of claim 1, wherein said coating comprises (in weight percent):
silicon: 20–60
aluminum: 10–70
phosphorus: 0.5–3.0
and is from 150 to 400 mu thick.

10. An abrasive material as of claim 1, wherein said alloy also comprises an element selected from the group consisting of yttrium, lanthanum and cerium, and taken in a quantity of from 0.01 to 25.00 weight percent.

11. The abrasive substance of claim 1 in which the abrasive grains are of diamond.

12. The abrasive substance of claim 1 in which the abrasive grains are of natural diamond.

13. The abrasive substance of claim 1 in which the abrasive grains are of synthetic diamond.

14. The abrasive substance of claim 1 in which the abrasive grains are of boron nitride.

* * * * *